E. R. HANSON.
TRACTOR ATTACHMENT FOR AUTOMOBILES.
APPLICATION FILED JUNE 8, 1918.
1,305,717.
Patented June 3, 1919.
5 SHEETS—SHEET 3.
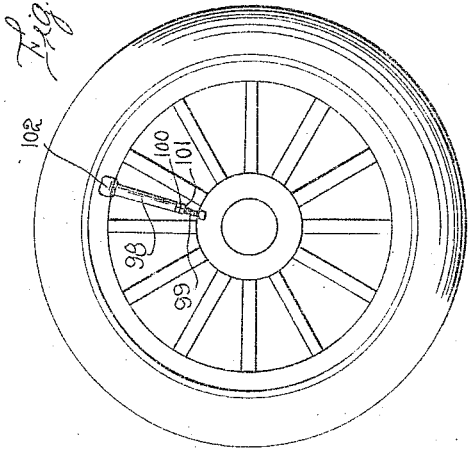
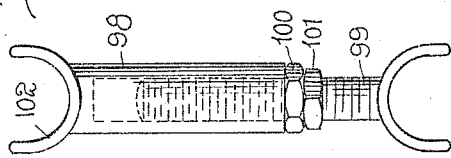
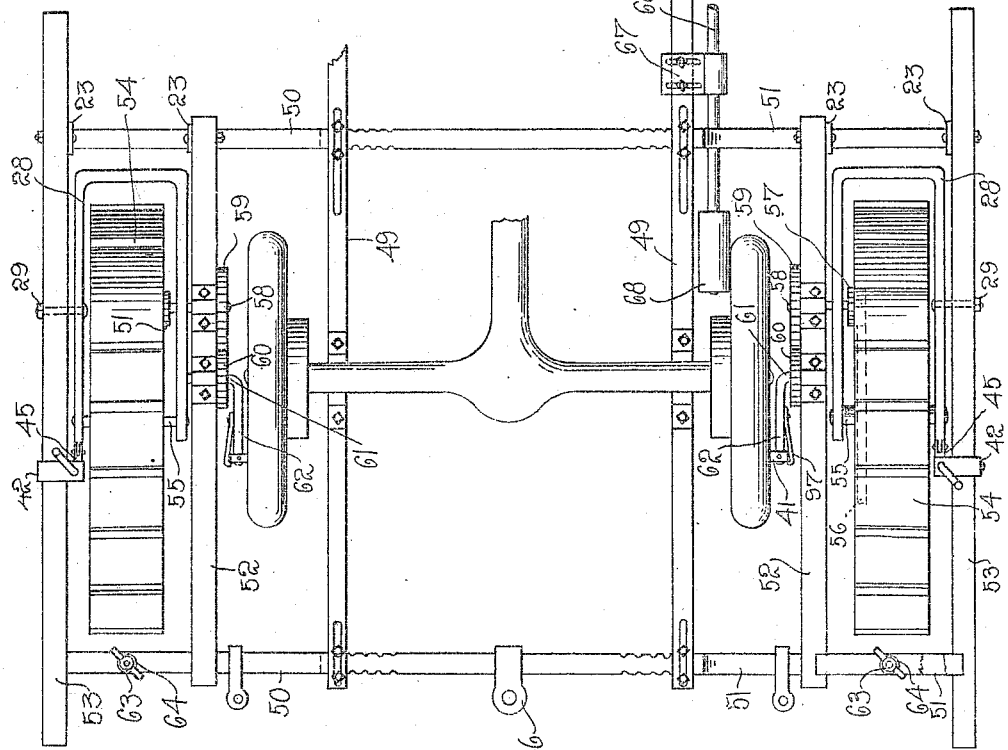
Inventor
E. R. Hanson
By Watson E. Coleman
Attorney

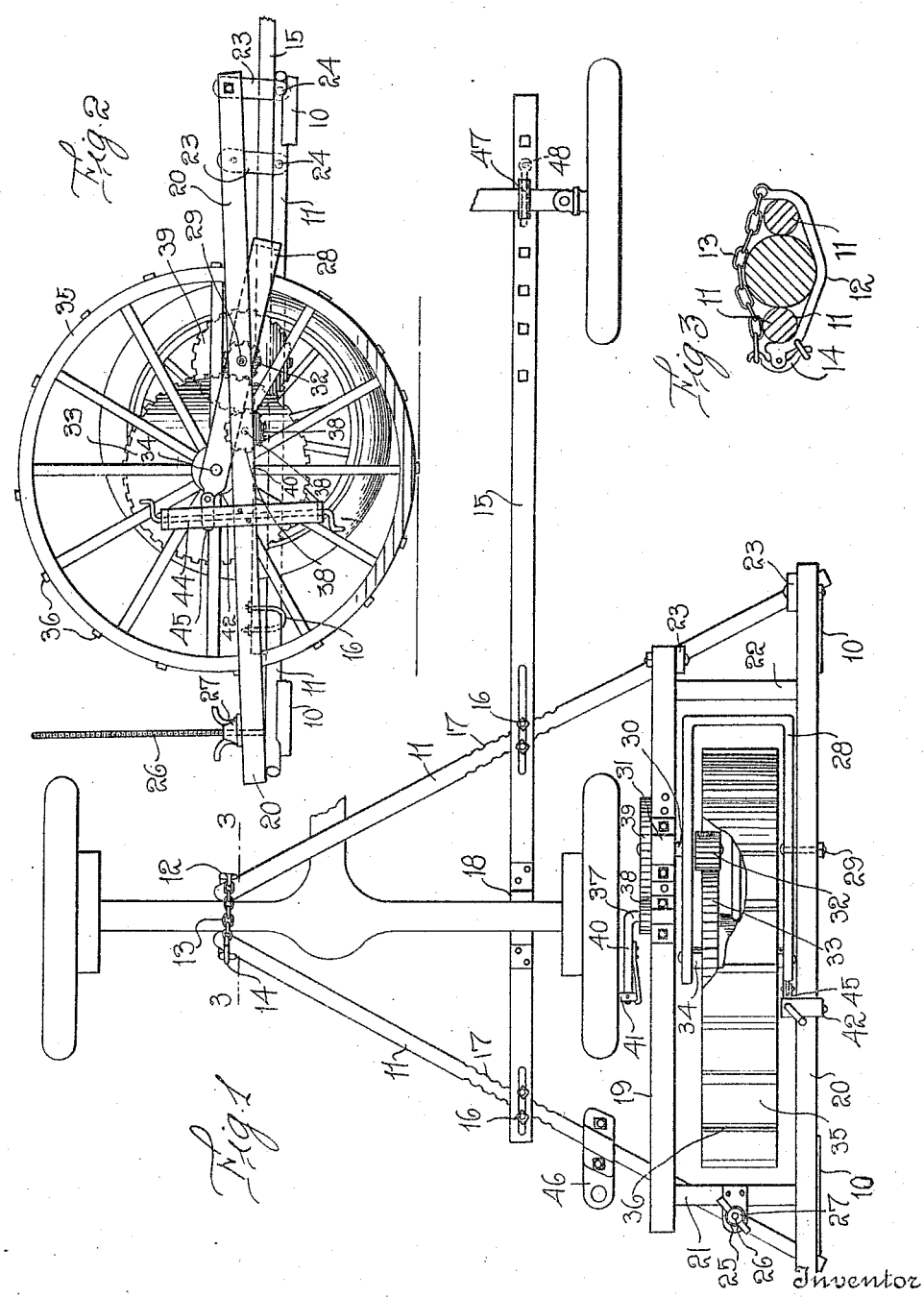

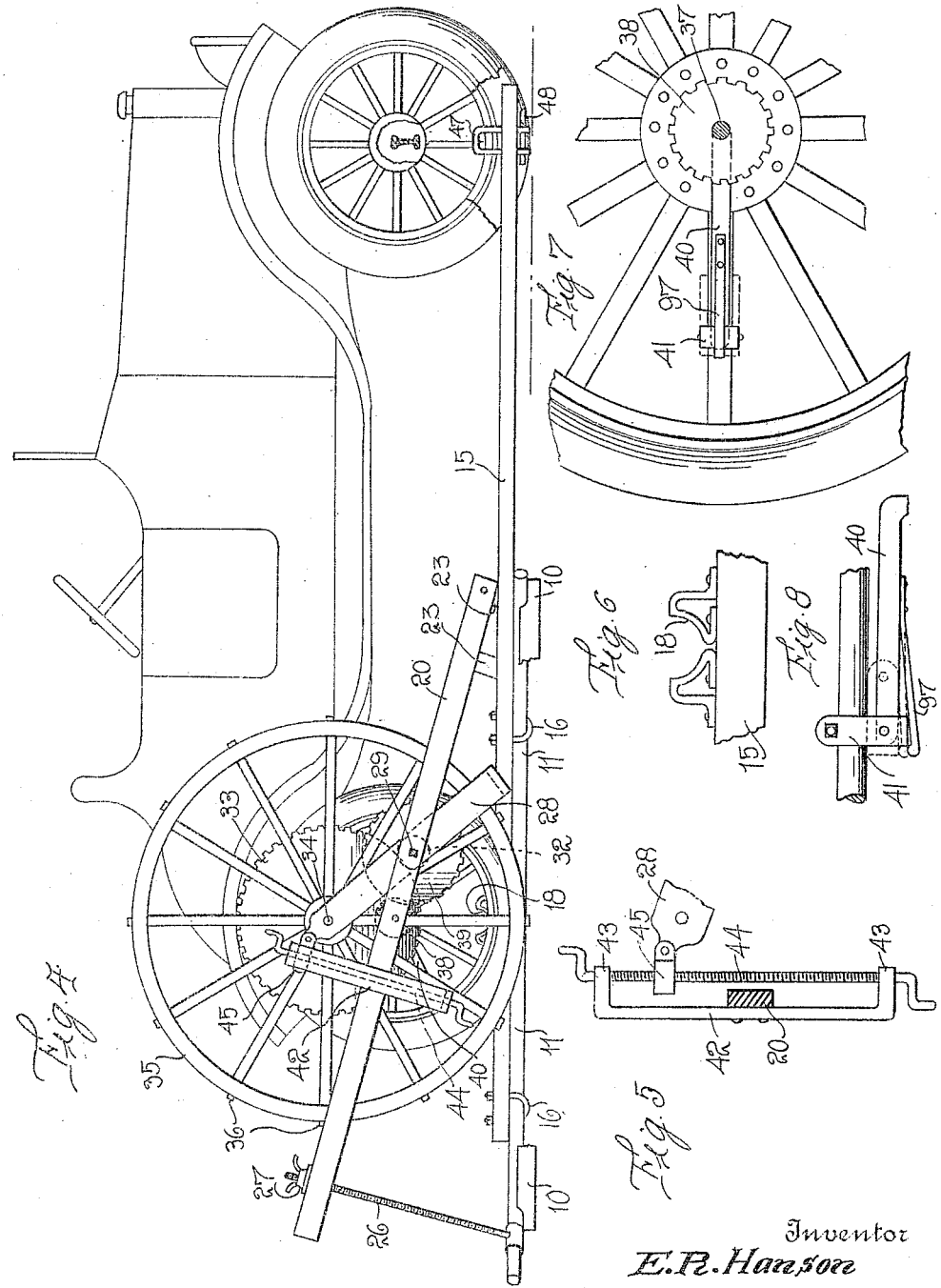

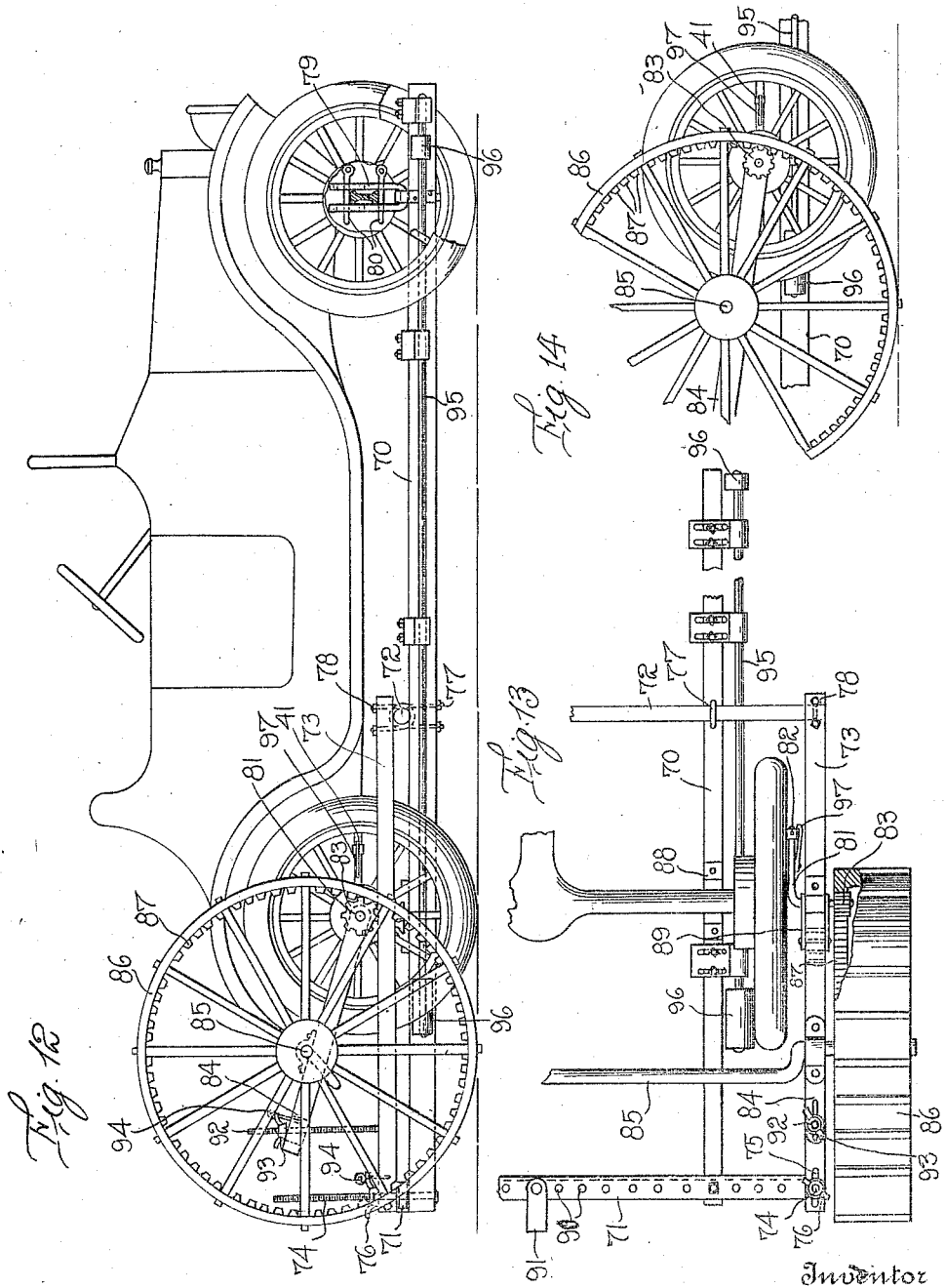

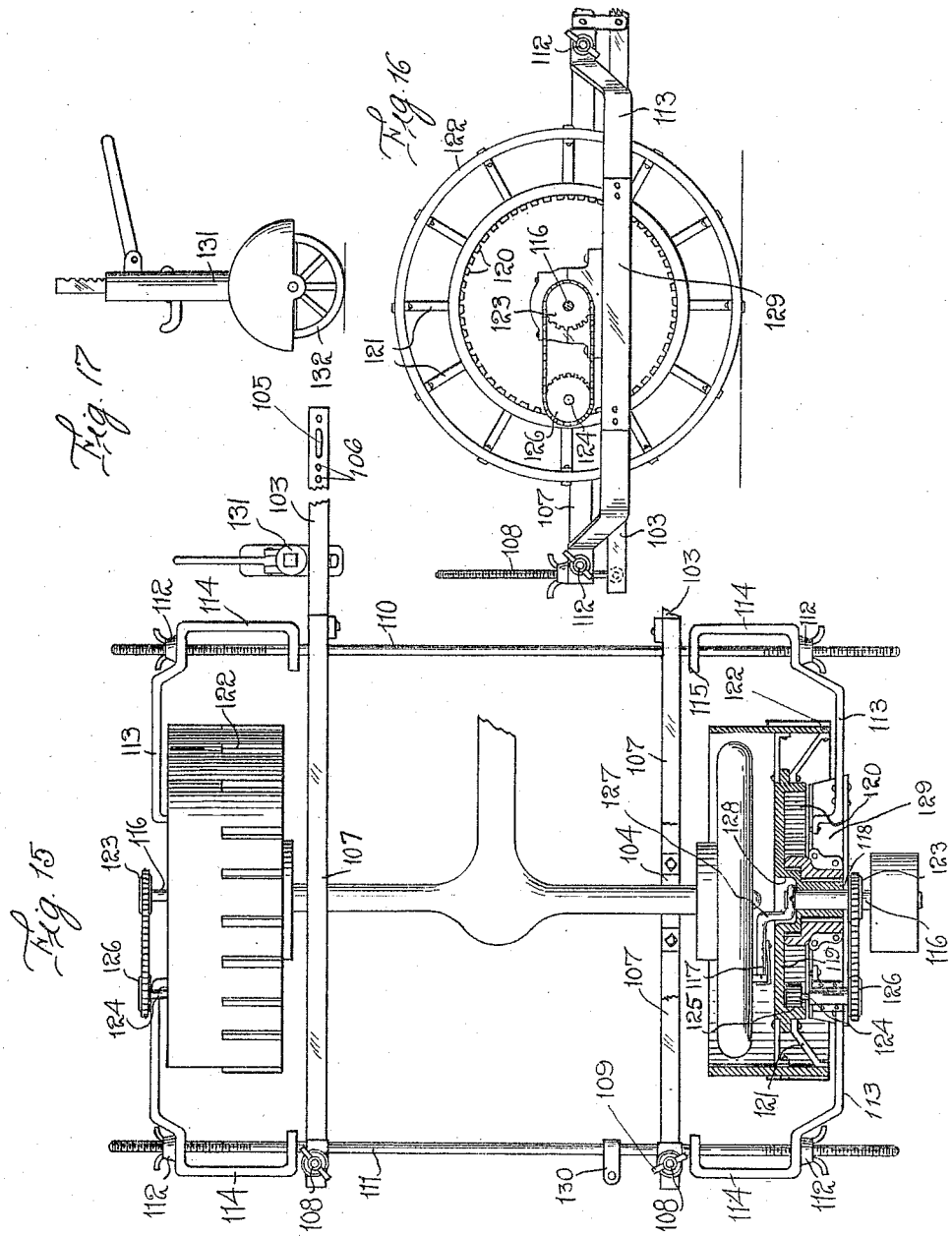

UNITED STATES PATENT OFFICE.

EDWIN R. HANSON, OF REDSTONE, MONTANA.

TRACTOR ATTACHMENT FOR AUTOMOBILES.

1,305,717.  Specification of Letters Patent.  Patented June 3, 1919.

Application filed June 8, 1918. Serial No. 238,939.

*To all whom it may concern:*

Be it known that I, EDWIN R. HANSON, a citizen of the United States, residing at Redstone, in the county of Sheridan and State of Montana, have invented certain new and useful Improvements in Tractor Attachments for Automobiles, of which the following is a specification, reference being had to the accompanying drawings.

This invention relates to tractors or trucks, and the general object of the invention is to provide an attachment by which an automobile such as is used for pleasure or business driving, may be converted into a tractor for the purpose of drawing loads, plowing, cultivating or performing other agricultural work.

A further object of the invention is to provide an attachment of this character having, generally speaking, the form of a truck adapted to be disposed partially beneath the rear end of the automobile frame, said truck attachment carrying one or more traction wheels and having means whereby the traction wheel or wheels may be engaged with the driving axle of the automobile, and partly engaged with the driving wheel or wheels of the automobile.

A further object is to provide an attachment of this character in which engagement between a driving wheel of the automobile and the traction wheel of the truck is secured by means of a crank operatively geared or connected to the traction wheel, and operatively engaged with the automobile wheel.

A further object is to provide, in connection with the truck attachment heretofore described, means whereby the rear end of the automobile may be jacked up so as to raise the driving wheel from the ground, thus supporting all of the weight of the truck upon the traction wheels, and in this connection to provide improved means whereby the depth of the plows or cultivators connected to the tractor may be regulated.

Still another object is to provide a construction of the character above outlined in the form of a supporting frame for the rear end of the automobile, said frame or truck having two traction wheels, and means for operatively engaging both of the rear wheels of the automobile with said traction wheels.

A further object is to provide in the construction just described, means whereby the rear wheels of the automobile may be disposed within and partially housed by the traction wheels, and whereby power may be transmitted from the automobile wheels to a gear wheel, meshing with an internally toothed gear forming part of the traction wheel.

A further object is to provide improved means whereby power may be taken from the automobile wheels and transmitted to the forward portion of the automobile to be used, for instance, in driving a radiator fan or like attachment.

Still another object is to provide a detachable spoke, as it may be termed, adapted to be applied to the wheel of an automobile to transmit power to my tractor attachment, without engaging the attachment with the spokes of the automobile wheel.

Other objects will appear in the course of the following description.

My invention is illustrated in the accompanying drawings, wherein:

Figure 1 is a top plan view of one form of my tractor attachment;

Fig. 2 is a side elevation thereof showing the attachment raised;

Fig. 3 is a section on the line 3—3 of Fig. 1;

Fig. 4 is a side elevation of the attachment in applied position, showing the attachment lowered;

Fig. 5 is a detailed view of the mount for the screw 44;

Fig. 6 is a fragmentary elevation showing the housing supporting seat;

Fig. 7 is a fragmentary side elevation of an automobile wheel showing the manner of connecting the crank 40 thereto.

Fig. 8 is a fragmentary plan view of the spoke engaging clip and the crank;

Fig. 9 is a top plan view of another form of my mechanism;

Fig. 10 is an elevation of an automobile wheel with a detachable spoke;

Fig. 11 is an elevation of the spoke itself.

Fig. 12 is a side elevation of another embodiment of my invention with the attachment lowered;

Fig. 13 is a fragmentary top plan view of the attachment;

Fig. 14 is a fragmentary side elevation showing the attachment raised;

Fig. 15 is a top plan view of another embodiment of my invention;

Fig. 16 is a side elevation thereof with the attachment raised; and

Fig. 17 is an elevation of the jack used in initially raising the attachment and the automobile.

Referring to Figs. 1 to 8, wherein one form of my invention is shown, it will be seen that in this case my improved attachment comprises a supporting frame formed of a longitudinally extending beam 10, and two laterally converging beams 11 connected to the ends of the longitudinally extending beam, as by bolts or in any other suitable manner, and yoked together at their convergent ends as at 12, and provided at their convergent ends with the chain 13 engaging with a locking member 14. Disposed parallel to the beam 10, is a longitudinally extending tongue 15, which is adapted to be detachably supported upon the forward axle of the automobile, this tongue 15 being provided with U-shaped clips 16, whereby the tongue may be connected to the convergent beams 11. Preferably these clips 16 are so formed as to interlock with the members 11 and I have illustrated these clips 16 as being in the form of U-bolts and the members 11 as being provided on their side edges with notches 17, with which these U-bolts are adapted to engage. Thus this tongue 15 may be shifted laterally to a limited degree and thereby adjusted to suit automobiles of different widths between the wheels. The tongue 15, between the beams 11, is provided with a seat 18 for the rear axle housing of the automobile.

Mounted upon the members 11 for vertical movement is a supporting frame comprising the beams 19 and 20 connected by transverse braces 21 and 22. The beams 19 and 20 at one end are provided with the angularly extending links 23, which extend down at the side of the beams 19 and 20 and are connected to said beams by transverse bolts 24, these bolts 24 being operatively connected to the member 11. The brace 21 is formed with an outwardly projecting ear 25, through which passes a screw or elongated bolt 26 carrying a wing nut 27 at its upper end, and pivotally connected at its lower end to the corresponding convergent beam 11. By this means, the frame, formed of the members 19 and 20, may be disposed at various inclinations to the horizontal tongue and the horizontally disposed beams 11.

Pivotally mounted between the beams 19 and 20 is a rectangular metallic frame 28. This frame is pivotally connected to the beams 19 and 20 by a bolt 29 on one side of the frame, and by a shaft 30 on the opposite side of the frame passing through a bearing 31 mounted on the beam 19. This shaft at its inner end carries the pinion 32, which meshes with a gear wheel 33 mounted upon a shaft 34, which forms the axle of the traction wheel 35. This traction wheel may be of any suitable character, but is preferably provided with the transversely extending ribs or teeth 36. Mounted upon the beam 19 is a shaft 37 having thereon a pinion 38, which meshes with a gear wheel 39 carried by the shaft 30 and carried upon the shaft 37 is a crank arm 40, which is provided at its extremity with a clamp 41, whereby the crank arm may be connected to a spoke of an automobile wheel. I have illustrated this clamp 41 as being in the form of a U-bolt pivotally mounted upon the end of the arm 40 and shiftable from a position at right angles to this arm 40 to a position parallel thereto. This clamp is intended to engage around the spoke of the automobile wheel, and be firmly connected thereto, so that the power of the automobile may be transferred to the shaft 37, thence by means of the gear wheels 38, 39, 32 and 33 to the traction wheel 35, (see Fig. 8).

For the purpose of adjusting the metallic frame 28, I mount on the beam 20 the yoke 42 having inwardly extending ends 43 through which passes the screw 44, this screw being provided with crank handles at its opposite ends and carrying a nut 45 which is pivoted to the adjacent side member of the frame 28. By rotating this screw 44 it will be seen that the frame 28 may be adjusted to various inclinations with relation to the frame composed of the members 19 and 20. The purpose of pivoting the frame 28 and providing the screw 44 is to provide means for raising the automobile wheel to any desired height off of the ground. Preferably the bearing 30 is adjustably mounted upon the frame 28 so as to permit of larger or smaller gear wheels 32 and 39 to be used to transmit power from the crank shaft 37 to the traction wheel, to thus change the ratios between the gear wheels 38—33 and the gear wheels 32—39.

Attached to one of the members 11 is a draw bar clip 46 whereby the draw bar of a gang plow for instance may be connected to the truck or frame formed by the members 10 and 11, and preferably, though not necessarily, the forward end of the tongue 15 is connected to the front axle of the vehicle by means of a U-shaped hanger 47, the lower end of which is provided with eyes for the reception of a locking pin 48, this hanger 47 passing through perforations in the tongue 15. Any other means may be used, however, for connecting the tongue to the forward axle of the automobile.

In the use of this device, the frame, composed of the members 19 and 20, is initially in the position shown in Fig. 4, with the tongue 15 disposed close to the ground and the traction wheel projecting but a short distance below the tongue. When it is desired to use this attachment, it is shifted in a position beneath the rear end of the automobile, so that the drive shaft housing of the automobile may be disposed within the seat 18, and then the nut 7 is turned so as to carry the frame composed of the members 19 and 20 into parallel relation to the tongue 15. This causes an elevation of the tongue until the seat 18 engages with the housing of the rear axle of the automobile and when this housing and the seat 18 are engaged, the chain 13 is passed around the housing of the rear axle and is fastened by means of the fastening device 14. The forward end of the tongue 15 is now connected to the front axle of the automobile, in the manner heretofore described, and the nut 27 may be further turned so as to still further elevate the driving wheel of the automobile with relation to the ground. The crank 40 is now connected to one of the spokes of the automobile wheel by means of the member 41, thus providing for transmitting power from the automobile wheel to the traction wheel 35. By rotating the screw 44, the traction wheel may be still further depressed with relation to the axis of the automobile wheel. The parts are now as shown in Fig. 2.

It will now be seen that power applied to the rear axle of the automobile will be transmitted through the spokes of one of the driving wheels to the crank 40, thence to the gears 38—39, thence to the gears 22 and 33 and thence to the traction wheels and an increase of power being secured by reducing speed through the use of reducing gears. It is further to be noted that changes in inclination of the frame 19—20 and the frame 28 does not in any way affect the intermeshing engagement between the gears 38 and 39 or the gears 32 and 33 for the reason that the gear 33, when it is adjusted, moves in an arc concentric to the shaft 30.

I have heretofore referred to this device as means for converting an automobile into a tractor, but it is to be understood that the attachment described might also be used as a means for supporting the rear end of an automobile, which has broken down, as for instance by damage to one of the wheels. In this latter case, however, an ordinary automobile driving wheel would be substituted for the toothed traction wheel 35.

In Figs. 9 to 11, I show an embodiment of my invention, which is preferable to that illustrated in Figs. 1 to 4, wherein the rear end of the automobile is supported by two traction wheels, instead of one, and wherein power is transmitted to these two traction wheels by means of cranks engaging with the two driving wheels of the automobile. In this form of the device, I illustrate two separate frames, each supporting a traction wheel, and each separately engaged with the frame of the automobile. While in Figs. 1 to 4, the frame for supporting the traction wheel and the allied parts was triangular in plan view, in this construction the frame is illustrated as formed of two longitudinally extending tongues 49 and two pairs of transversely extending beams 50 and 51, the supporting frames composed of the members 52 and 53 and the traction wheels 54.

Each traction wheel 54 is mounted upon a shaft 55 carrying a gear wheel 56 engaged by a pinion 57, mounted upon a shaft 58, carrying a gear wheel 59 meshing with a pinion 60 carried upon the crank shaft 61 having a crank 62, constructed as previously described and adapted to engage the spoke of the automobile wheel. In other words, the mechanism for transmitting power from the automobile wheel to the traction wheel is the same as that heretofore described. Each of the frames formed by the members 52 and 53 is pivotally connected to the members 50 or 51 at one end and the other end of each frame is engaged with the other member 50 or 51 by means of the screw 63 having thereon the wing nut 64.

It will be noted that in the construction just described, I have retained the auxiliary pivoted frame 28 and secure adjustment of the traction wheels relative to the automobile wheels, also by means of the nuts 45. It is to be understood, of course, that means are to be provided whereby the members 50 and 51 may be operatively connected to the frame of the automobile and whereby the tongues 49 may be also connected to the front axle. This construction operates on precisely the same principle as heretofore explained, and therefore I have used the same reference numerals for the parts which are common to both constructions. It is better in some respects than the construction first described, inasmuch as two traction wheels are provided and the automobile is supported on these two traction wheels, instead of upon one traction wheel. If it be desired to provide means whereby power may be transmitted from the rear driving wheels of the automobile to the forward end of the automobile, I may mount upon one of the tongues 49, the shaft 66, the rear end of this shaft being mounted in an adjustable bearing 67 and carrying a relatively wide roller or friction wheel 68, which bears against the inside face of the automobile wheel. The forward end of the shaft 66 may be provided with the pulley or roller 69 over which a belt may be passed, which may, if desired, be connected to a fan shaft disposed in front of the radiator and carrying a fan thereon, whereby to positively force air through the radiator to cool the same, this being particularly desirable on tractors, for the reason that the slow movement of the tractor does not provide for a proper cooling of the radiator. In other words, when an automobile is used as a tractor, some change has to be made in the cooling devices in order to provide for a proper draft of air through the radiator at the slow speeds at which the tractor is moving. Preferably the forward pulley 69 will be adjustable on the shaft 66 so as to bring it in a position to conform to the particular make of fan used.

In Figs. 12 to 14, I show still another form of my invention comprising the longitudinally extending beams or tongues 70, the transverse rear brace 71, the forward transverse brace 72, and the longitudinally extending beams 73, which are swingingly connected to the transverse brace or bar 72 and which are engaged with the transverse braces 71, by means of vertically disposed screws 74, which are operatively supported upon the brace 71. These screws 74 pass through slots 75 in the beams 73 and carry the nuts 76. A transverse beam or brace 72 is illustrated as being connected to the tongues 70 by means of U-bolts 77 and the longitudinal beams 73 are illustrated as connected to the transverse brace 72 by U-bolts 78. Any other suitable means may be provided, however. The forward ends of the tongues 70 are designed to be connected to the forward automobile axle in any suitable manner, as for instance by U-shaped clips 79 having vertical perforated arms, through which pins 80 are passed, and provide for an adjustment of the tongues relative to the forward axle of the automobile, this adjustment being necessary because the forward axles of automobiles vary in height.

Carried upon each member 73 is a crank 81, whose outer end is formed with a clip 82, whereby it may be connected to the spoke of the automobile wheel, the inner end of this crank shaft 81 carrying the pinion or gear wheel 83. Swingingly mounted upon each crank shaft 81 as an axis is an arm 84, and carried in bearings on the free ends of these arms is the axle 85 supporting at its ends the traction wheels 86. These traction wheels are illustrated as being formed with internal teeth 87 engaging with the pinions or gear wheels 83. It will be understood that these traction wheels 86 preferably rotate freely on the axle 85. I have illustrated in full lines in Fig. 13, the axle 85 as being rearwardly bent or arched, as will be necessary where the attachment is designed to be used with automobiles having driving wheels of relatively large diameter and provided with dirt proof gear cases.

The tongues 70 are provided with the adjustable seats 88 for the rear axle housing of the automobile, and it will be noted from Fig. 13, that the arms 84 are swingingly connected to the crank shaft 81 by adjustable yokes 89. Preferably the transverse bar 71 is of angle iron and is provided with a plurality of perforations 90 for engagement with the draw bar clevis 91. Extending upward from each of the members 73 is a screw 92 which passes loosely through a slot in the corresponding arm 84 and engaging this screw-threaded rod 92 and bearing upon the top of the corresponding arm 84 is a nut 93, which when rotated in one direction causes the screw 92 to lift the supporting frame 73 upward and lift with it the rear end of the automobile. These nuts 76 and 93 may be held in adjusted positions by pins 94 passing through the wings of the nuts and into the members 73 and 84 respectively.

I have also illustrated in this embodiment of my invention a longitudinal shaft 95 supported in suitable bearings upon one of the tongues 70, this shaft carrying upon it the forward and rear pulleys 96, one of these pulleys acting as a friction wheel and bearing against the driving wheel of the automobile, and the other pulley being adapted to receive a belt extending from a fan disposed in front of the radiator, as previously described.

While I do not wish to be limited to any particular manner of connecting the cranks 40 or 81 to the spokes of an automobile wheel, I have illustrated in Figs. 1 to 9, a U-shaped clip which engages with the spokes and which is held in a projected position by means of a spring detent, designated 97 in Fig. 8. I have heretofore referred to this spring clip 41 or 82 as engaging a permanent spoke on the driving wheel of the automobile, but I do not wish to be limited to this, inasmuch as I preferably use a supplemental spoke illustrated in detail in Fig. 11, and comprising two telescopic members 98 and 99, the member 99 being screw-threaded and fitting within the tubular member 98 and engaged by nuts 100 and 101, the nut 100 being mounted upon the member 98. The members 98 and 99 are provided with the heads 102, formed to fit one against the inside face of the rim of the automobile wheel and the other to fit against the hub. By this means, this additional spoke may be disposed in position between the regular or permanent spokes and connected very rigidly with the wheel, so as to rotate therewith and transmit power to the cranks, without engaging the cranks with the permanent spokes, thus preventing all damage to the permanent spokes.

It will be seen that the construction illustrated in Figs. 12 to 14, operates in practically the same manner as the construction first described, as far as elevating the rear end of the automobile goes. Initially the members 73 are in the position shown in Fig. 12, so that the tongues 70 are disposed adjacent to and parallel with the ground. Under these circumstances, the truck or attachment may be readily slipped beneath an automobile. Then the forward ends of the tongues are connected to the front axle, and then the nuts 76 turned to cause the rear ends of the tongues to move upward relative to the member 73 until the rear end of the automobile is elevated. By rotating the nuts 93, it is now possible to adjust the height of the tongues and of the rear end of the automobile relative to the ground. Thus, for instance, if plows are attached to the tongues or longitudinal members 70, and it is desired to plow to a depth of ten inches, then the parts are so adjusted that the automobile wheels just escape the ground. A less depth of the plows is secured by raising the tongues and the rear ends of the automobile higher.

The principle of my invention may also be applied in the manner illustrated in Figs. 15 to 17. Referring to these figures, in this case the supporting frame for my attachment comprises the longitudinally extending beams or tongues 103. These beams 103 or tongues carry members 104 for supporting the rear axle housing of the automobile and at their forward ends are provided with U-bolts 105 passing through any one of a plurality of perforations 106, these U-bolts being adapted to embrace the forward axle of the automobile and support the tongues thereon. Swingingly mounted upon the beams or tongues 103 are the longitudinally extending supporting beams 107, which at their free ends are provided with vertically extending screws 108, which are engaged with the rear ends of the tongues 103, these screws passing through slots in the members 107, and carrying the nuts 109 which may be in the form of wheels. Extending through the beams 107 are the forward and rear screw-threaded rods 110 and 111. These rods are screw-threaded at their extremities and these screw-threaded portions are engaged by nuts 112. Swingingly mounted upon the rod 110 and extending rearwardly therefrom are the supporting bars 113, these bars extending for the greater portion of their length approximately parallel to the longitudinal axis of the machine, but each of these bars at its inner end being laterally bent as at 114 and angled at its end as at 115 so that the rod 110 passes through the forward ends of the bars 113 and pivotally supports these bars. Bars 113 of like character to the bars 113 previously referred to are mounted upon the rod 111, and these bars 113 on each side of the machine are connected as by riveting to a longitudinal beam or plate 129, which is relatively wide. Nuts 112 engage with the screw-threads on the rods 110 and 111 and by this means the bars 113 may be urged inward, the nuts permitting the bars 113 to be drawn outward away from the beams 107 when the nuts are turned off toward the ends of the rods 110 and 111.

The transmitting mechanism is mounted upon the beam 129 and comprises on each side of the machine a crank shaft 116 having a crank 117. Surrounding this crank shaft 116 is a rotatable sleeve 118 having a web 119 carrying at its periphery the internal gear 120, the web being connected by spokes 121 to a traction wheel 122. The sleeve 118 rotates in anti-friction bearings mounted on the beam 129.

The power of the crank shaft 116 is transmitted to the traction wheel by means of the sprocket wheel 123 having a sprocket chain engaging with the sprocket wheel 126 on a shaft 124, bearing upon it a pinion 125 which engages with the internal gear 120. The crank arm 117 is provided with means heretofore described whereby it may be connected to either a permanent or a temporary spoke on the automobile driving wheel.

The crank shaft 116 at its junction with the arm 117 is deflected as at 127 to accommodate the hub of the automobile driving wheel and the center of the web 119 is likewise inwardly deflected for the same purposes. It will be seen that when the mechanism is in operative position that the automobile wheel is diposed entirely within the traction wheel 122 and housed thereby. It will be noted that the lugs on the traction wheel 122 are only half the width of the wheel to permit the smooth portion of the drive wheel to slide under the fenders of the automobile without necessitating the removal of the fenders. The rod 111 will have a sufficient diameter to stand heavy strains and to this rod will be attached the draw bar clip 130.

In the practical use of the form of the invention illustrated in Figs. 15 to 17, the nuts 109 are so turned as to permit the tongues 103 to be disposed adjacent the ground with the members 107 disposed at an angle in the same manner as illustrated in Fig. 12. Under these circumstances the automobile is backed into place between the tongues with its rear axle housing disposed above the seats 104, and then the forward ends of the tongues 103 are connected by the clips 105 to the forward axle of the machine. The nuts 109 are then turned downward, which lifts the tongues and lifts the rear end of the automobile until the automobile wheels are disposed about 1″ off of the ground. A jack 131 of any suitable construction, but preferably provided with a wheel 132, is disposed beneath one or the other of the bars 113 or beneath both of these bars and the jack is then operated to lift the entire mechanism up to a distance where the traction wheels 122 will clear the ground. At this time the bars 113, which form the immediate supports for the traction wheels and the gearing will be disposed in spaced relation to the members 107 and when the rear end of the machine and the vehicle have been raised to a proper height to cause the traction wheels to clear the ground, the nuts 112 are turned to cause the bars 113 to shift inward in such position as to carry the traction wheels over the automobile wheels and carry the hubs of the automobile into the central recesses formed by the deflected portions 128 of the web 119.

When this is accomplished the cranks 117 are connected to the automobile spokes and then the jack is lowered, allowing the traction wheels to again rest on the ground. The mechanism will then be in condition for operation in the manner heretofore described. The object of providing the wheels 132 on the jacks 131 is to permit the inward shifting of the bars 113. It will be understood, of course, that this construction is to be made in various sizes, so that, for instance, one size of attachment will fit automobile wheels from size 30 to size 36, another will fit wheels from size 30 to size 33, and another will fit wheels from size 34 to size 36.

It will be seen that all forms of my invention are adapted to be attached to various makes of automobiles and various sizes of automobiles and that the parts are adjustable through a relatively large range. The attachment may be used for any purposes for which a tractor is designed to be used and plows, cultivators, harrows or like agricultural implements may be dragged by the converted tractors, or plows, cultivators and the like may be mounted directly upon the tongues in the various forms of my invention or upon the transverse braces, the depth of action of these plows or cultivators being regulated by controlling the height that the tongues or supporting frame are supported above the ground. The attachment may be very simply and strongly made, and it may be applied to or removed from an automobile in a very few minutes. By taking the power directly from the driving wheels of the automobile, I eliminate the necessity of applying driving gears, driving sprocket wheels or the like to the driving axles of the automobile, as, for instance, over the hub caps of the wheel, and also eliminate the necessity of removing the driving wheels of the automobile in order to apply transmission gears thereto. This takes time and by using a device which engages the spokes of the wheel, I save this time.

I do not wish to be limited to the details of construction as shown, as it is evident that the principle of the invention may be applied to many different forms and it is further obvious that the frame members, braces, tongues, etc. may be formed of any suitable material having any desired cross sectional shape to secure requisite strength and rigidity of parts. Neither do I wish to be limited to the use of one crank arm for connecting the crank shaft of my attachment to an automobile wheel, as it is obvious that a plurality of crank arms might be used.

Having described my invention, what I claim is:

1. A tractor attachment including a supporting frame, a traction wheel carried thereby, and a crank operatively connected to the traction wheel and having means for engaging it with a spoke of an automobile wheel.

2. A tractor attachment including a supporting frame, a traction wheel mounted thereon, a crank mounted thereon and operatively connected to the traction wheel, and a member mounted upon the crank for detachable engagement with the spoke of an automobile drive wheel.

3. A tractor attachment including a supporting frame, a traction wheel thereon, a crank operatively connected to the traction wheel and mounted on the frame, and a U-shaped spoke clip operatively supported upon the extremity of the crank and adjustable into or out of engagement with the spoke of an automobile drive wheel.

4. A tractor attachment including a supporting frame, a traction wheel carried thereby, a crank operatively mounted on the frame and operatively connected to the traction wheel, a U-shaped spoke clip pivotally mounted upon the crank and adapted in one position to embrace a spoke of an automobile drive wheel, and a spring latch holding the clip in its operative or inoperative positions.

5. A tractor attachment including a supporting frame, a traction wheel carried thereby, a crank operatively connected to the traction wheel and mounted upon the frame, a supplemental spoke comprising longitudinal adjustable parts adapted to bear respectively against the rim and hub of an automobile drive wheel, and a member mounted upon the crank for detachable engagement with said supplemental spoke.

6. A tractor attachment including a supporting frame, a traction wheel, a supplemental frame hingedly connected to the supporting frame for vertical movement, means for vertically adjusting the supplemental frame relative to the supporting frame, a member pivotally mounted upon the supplemental frame for movement in a vertical plane, and having bearings for the support of the traction wheel, means for vertically adjusting said member, and means for operatively connecting the traction wheel to the driving wheel of an automobile.

7. A tractor attachment including a supporting frame, a traction wheel, a supplemental frame hingedly connected to the supporting frame for vertical movement, means for vertically adjusting the supplemental frame relative to the supporting frame, a member pivotally mounted upon the supplemental frame for movement in a vertical plane, and having bearings for the support of the traction wheel, means for vertically adjusting said member, and means for operatively connecting the traction wheel to the driving wheel of an automobile, including a crank shaft disposed concentric to the pivotal axis of the said member and having means thereon operatively engaging the traction wheel, and a clip mounted on the crank adapted to operatively engage the driving wheel of an automobile.

8. A tractor attachment comprising a main supporting frame, a supplemental frame pivotally mounted thereon for movement in a vertical plane, means for vertically adjusting the free end of the supplemental frame, a traction wheel having an axle operatively supported in bearings on the supplemental frame, a crank shaft mounted on the supplemental frame and having a crank arm adapted to be operatively engaged with the drive wheel of an automobile, a gear wheel operatively engaged by the crank shaft and driven thereby, said gear wheel operatively engaging the traction wheel.

9. An attachment of the character described comprising a main frame, including a longitudinally extending tongue having a seat for the rear axle housing of an automobile, and transverse members to which the tongue is connected, a supplemental frame hingedly mounted upon one of the transverse members for movement in a vertical plane, means at the extremity of the supplemental frame for raising or lowering it relative to the main frame, a crank shaft mounted upon the supplemental frame and having a crank arm formed with means whereby it may engage the drive wheel of an automobile, a traction wheel mounted upon the supplemental frame, and transmission gearing between said crank shaft and the traction wheel.

10. A tractor attachment comprising a main frame formed of a longitudinally extending tongue having means for supporting the rear axle housing of an automobile and transversely extending beams operatively connected thereto, a supplemental frame hingedly mounted upon the main frame for movement in a vertical plane, a screw mounted upon the main frame and operatively engaging the opposite end of the supplemental frame whereby the supplemental frame may be shifted in a vertical plane, a traction wheel mounted upon the supplemental frame and having gear teeth, a crank shaft mounted on the supplemental frame and having a crank arm provided with means whereby it may be engaged with a spoke of an automobile drive wheel, and transmission gearing between said crank shaft and the gear teeth of the traction wheel.

11. An attachment of the character described including a supporting frame, having means for supporting the rear axle housing of an automobile and engaging the front axle thereof, a crank shaft mounted upon the supporting frame and having a crank arm provided with means whereby it may be engaged with the drive wheel of an automobile, a traction wheel operatively supported upon said frame, gearing operatively connecting the traction wheel to the crank shaft, and means for raising or lowering the supporting frame relative to the traction wheel and maintaining at all times a driving relation between said crank shaft and the traction wheel.

12. A tractor attachment including a supporting frame having a longitudinally extending member carrying means whereby it may be engaged with the front axle of an automobile, transverse members mounted upon said longitudinal member, traction wheels operatively mounted upon said transverse members, means whereby the traction wheels may be operatively engaged with the driving wheels of an automobile, a longitudinally extending shaft mounted upon said longitudinal member and having at its rear end a friction roller adapted to be engaged with and rotated by the rear driving wheel of an automobile, the forward end of the shaft carrying an element adapted to be engaged with the fan shaft of the automobile.

In testimony whereof I hereunto affix my signature in the presence of two witnesses.

EDWIN R. HANSON.

Witnesses:
S. E. PAUL,
JAMES C. POWELL.